US008683928B2

(12) United States Patent
Anderson

(10) Patent No.: US 8,683,928 B2
(45) Date of Patent: Apr. 1, 2014

(54) LASER BARRIER SYSTEM FOR OPTICAL TABLES

(75) Inventor: Sean Anderson, Richmond, VA (US)

(73) Assignee: Honeywell International Inc., Morristown, NJ (US)

(*) Notice: Subject to any disclaimer, the term of this patent is extended or adjusted under 35 U.S.C. 154(b) by 176 days.

(21) Appl. No.: 13/409,346

(22) Filed: Mar. 1, 2012

(65) Prior Publication Data
US 2013/0186003 A1 Jul. 25, 2013

Related U.S. Application Data

(60) Provisional application No. 61/589,852, filed on Jan. 23, 2012.

(51) Int. Cl.
*A47B 37/00* (2006.01)
(52) U.S. Cl.
USPC ........................................ 108/50.11; 312/328
(58) Field of Classification Search
USPC ......... 312/327, 328, 287, 290, 283, 237, 236, 312/257.1, 263, 265.1–265.4, 109; 108/25, 108/27, 50.11; 49/381, 394, 402; 403/188, 403/237; 248/671, 674, 200, 300; 16/268
See application file for complete search history.

(56) References Cited

U.S. PATENT DOCUMENTS

| | | | | |
|---|---|---|---|---|
| 515,858 A | * | 3/1894 | Collins | 269/16 |
| 2,119,799 A | * | 6/1938 | Sivey | 126/9 R |
| 2,627,854 A | * | 2/1953 | Sava | 126/25 R |
| 3,351,405 A | * | 11/1967 | Ferdinand et al. | 312/297 |
| 3,966,285 A | * | 6/1976 | Porch et al. | 312/265.4 |
| 4,128,285 A | * | 12/1978 | Lore et al. | 312/196 |
| 4,492,215 A | * | 1/1985 | DiGianvittorio | 126/9 R |
| 4,600,252 A | * | 7/1986 | Barber | 312/263 |
| 4,638,166 A | | 1/1987 | Baudro | |
| 5,006,718 A | | 4/1991 | Lenhart | |
| 5,352,032 A | * | 10/1994 | Cisternino | 312/265.3 |
| 5,981,964 A | | 11/1999 | McAuley et al. | |

(Continued)

FOREIGN PATENT DOCUMENTS

| | | |
|---|---|---|
| EP | 2174322 A1 | 4/2010 |
| WO | 0215198 A1 | 2/2002 |
| WO | 2009/017872 * | 2/2009 |

OTHER PUBLICATIONS

Laservision, High Power Laser Barrier, http://www.uvex-laservision.de/en/large_area_laser_protection/high_power_laser_barrier/.

*Primary Examiner* — Janet M Wilkens
(74) *Attorney, Agent, or Firm* — Barlow, Josephs & Holmes, Ltd.

(57) ABSTRACT

A laser barrier system for an optical table includes a plurality of laser barrier panels hingeably mounted to the edge of the table by a plurality of spaced hinge brackets. The hinge brackets include a horizontal flange secured to the surface of the table, a lower pivot support extending downwardly from the flange and an upper support column extending upwardly from the flange. Each hinge bracket supports a vertically extending jamb member secured to the upper support column. Each laser barrier panel is hingeably supported by pivot pins between a pair of spaced hinge brackets and their associated jamb members, and is hingeably movable about the pivot pins between a closed position and an open position. Each laser barrier panel is maintained in the closed position by a spaced pair of rotatable latch tabs that selectively engage with the adjacent jamb members.

17 Claims, 19 Drawing Sheets

(56) References Cited

U.S. PATENT DOCUMENTS

| | | |
|---|---|---|
| 5,992,417 A | 11/1999 | Toepel |
| 6,278,125 B1 | 8/2001 | Belek |
| 6,565,165 B2 * | 5/2003 | Switkes .................. 312/249.13 |
| 6,571,852 B2 | 6/2003 | Toepel |
| 7,032,401 B2 * | 4/2006 | Dresser .......................... 62/246 |
| 7,800,087 B2 | 9/2010 | Pieger |
| D651,429 S * | 1/2012 | Ussen .......................... D6/440 |
| 2007/0252095 A1 | 11/2007 | Magram |

* cited by examiner

LASER BARRIER SYSTEM FOR OPTICAL TABLES

CROSS-REFERENCE TO RELATED APPLICATIONS

This application claims benefit to earlier filed U.S. Provisional Patent Application No. 61/589,852, filed Jan. 23, 2012, the entire contents of which is incorporated herein by reference.

BACKGROUND

The present specification relates to laser barriers for optical tables, and more particularly to a laser barrier system mounted to an optical table.

SUMMARY

A laser barrier system for an optical table includes a plurality of laser barrier panels hingeably mounted to the peripheral edges of the optical table by a plurality of spaced hinge brackets. The hinge brackets include a horizontal flange secured to the upper surface of the table, a lower pivot support extending downwardly from the flange along the side of the table and an upper support column extending upwardly from the flange above the upper surface of the table. Each hinge bracket supports a vertically extending jamb member secured to the upper support column. In use, the hinge brackets are mounted at spaced intervals along the peripheral edges of the table. There are side hinge brackets that are mounted on the flat side edges of the table, and corner hinge brackets mounted in the corners of the table. Flat jamb members are supported on the side hinge brackets and right angle jamb members are supported on the corner hinge brackets.

Each laser barrier panel is hingeably supported by pivot pins between adjacent support brackets and their associated jamb members, and is hingeably movable about the pivot pins between a closed position and an open position. The side hinge brackets and corner hinge brackets are fabricated so that the axes of the pivot pins are spaced outwardly from the side edges of the table creating a gap between the edges of the table and the laser barrier panels for the routing of cables, wires, and tubing to instruments and components on the optical table. In addition, the axes of the pivot pins are located below the upper surface of the table so that the laser barrier panels overlap the side edge of the table. This overlap prevents laser light from escaping beneath the barrier panels and improves the safety of the system.

Each laser barrier panel is maintained in the closed position by a spaced pair of rotatable latch tabs that selectively engage with the adjacent jamb members. The laser barrier panels also overlap the jamb members to prevent the escape of laser light and further improve the safety of the system.

To provide flexibility for a variety of different size tables, the laser barrier system further includes at least one adjustable laser barrier panel that is laterally adjustable in width. The adjustable panel includes a center panel, and left and right side panels which are slidably movable relative to the center panel to permit the panel to be adjusted in width. The adjustable panel is supported on the hinge brackets in the same manner as the fixed width barrier panels and is maintained in the closed position by the same rotatable latch tabs located on the left and right side panels.

The laser barrier system further includes a retractable, spring-loaded dust shade assembly which is seated on top of the jamb members located at opposing ends of the laser barrier system and includes a shade which can be unwound to cover the top of the table. The spring loaded dust shade assembly includes opposing end brackets which sit on top of the jamb members, and a central beam extending between the end brackets. The retractable shade is housed within a reel system located at one.

Accordingly, an objective is to provide a laser barrier system having at least one hinged laser barrier panel that can be opened to more easily access instruments and components on the table.

Another objective is to provide such a laser barrier system where the hinge point of the laser barrier panels is below the surface of the table.

Another objective is to provide a laser barrier system where the hinge point is spaced outwardly from the side edge of the table so that there is a gap between the table and the laser barrier panels for the routing of cables, wires, and tubing to instruments and components on the optical table.

Yet another objective is to provide a laser barrier system having an adjustable laser barrier panel to accommodate a variety of different size optical tables.

Other objects, features and advantages shall become apparent as the description thereof proceeds when considered in connection with the accompanying illustrative drawings.

BRIEF DESCRIPTION OF THE DRAWING FIGURES

An exemplary embodiment will now be described further by way of example with reference to the following examples and figures, which are intended to be illustrative only and in no way limiting upon the scope of the disclosure.

DETAILED DESCRIPTION OF AN EXEMPLARY EMBODIMENT

Figure 1:
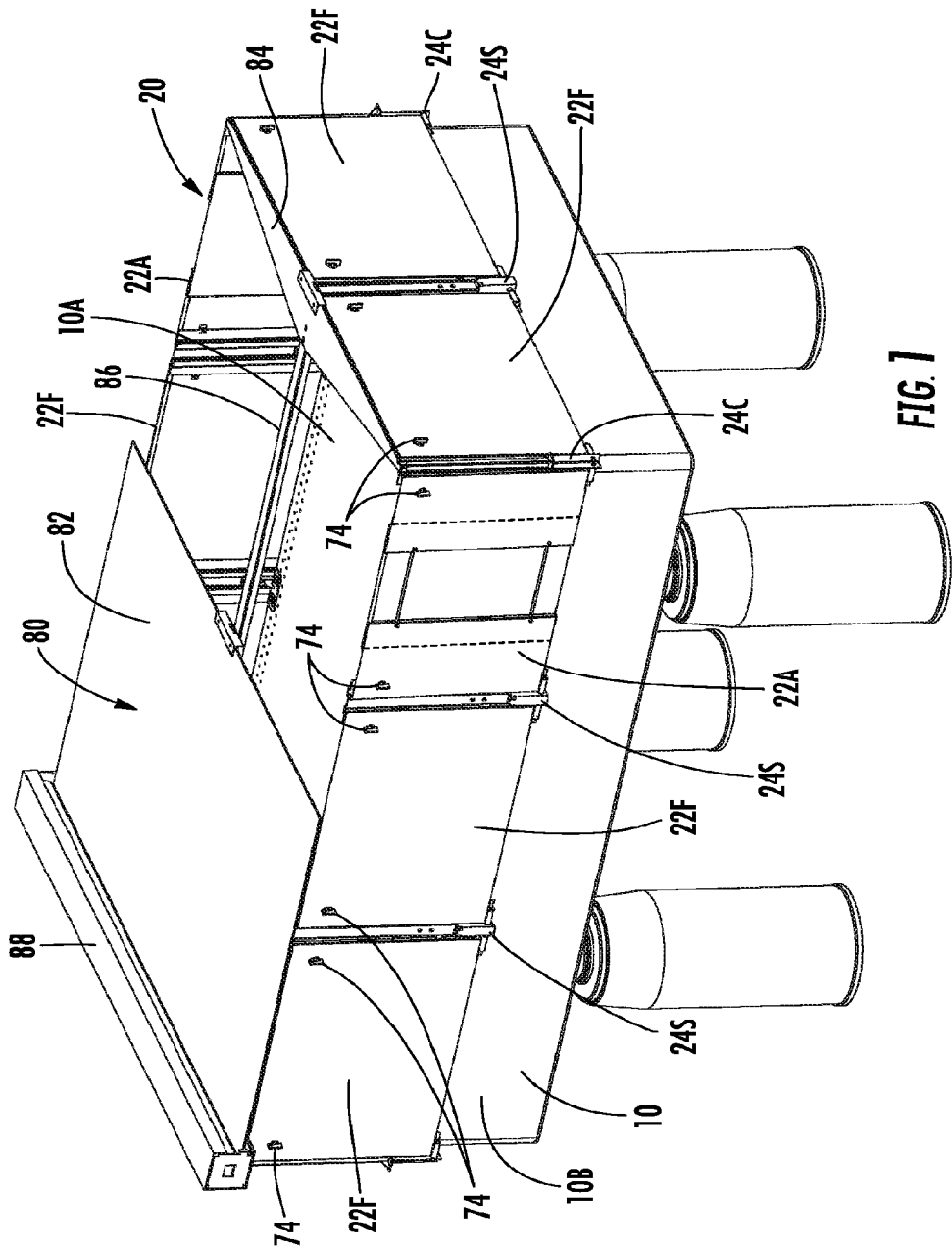
FIG. 1 is a perspective view of the laser barrier system constructed in accordance with the teachings of the present disclosure.
Figure 2:
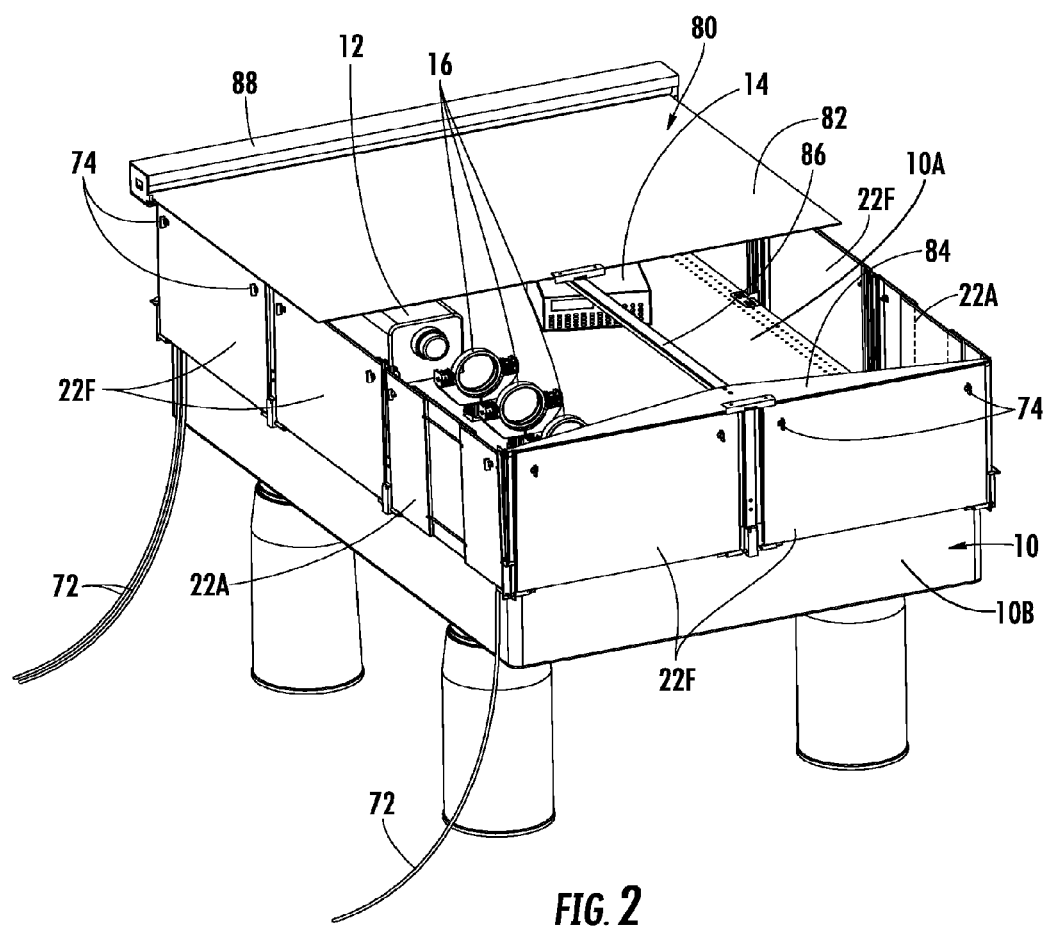
FIG. 2 is another perspective view thereof.
Figure 3:
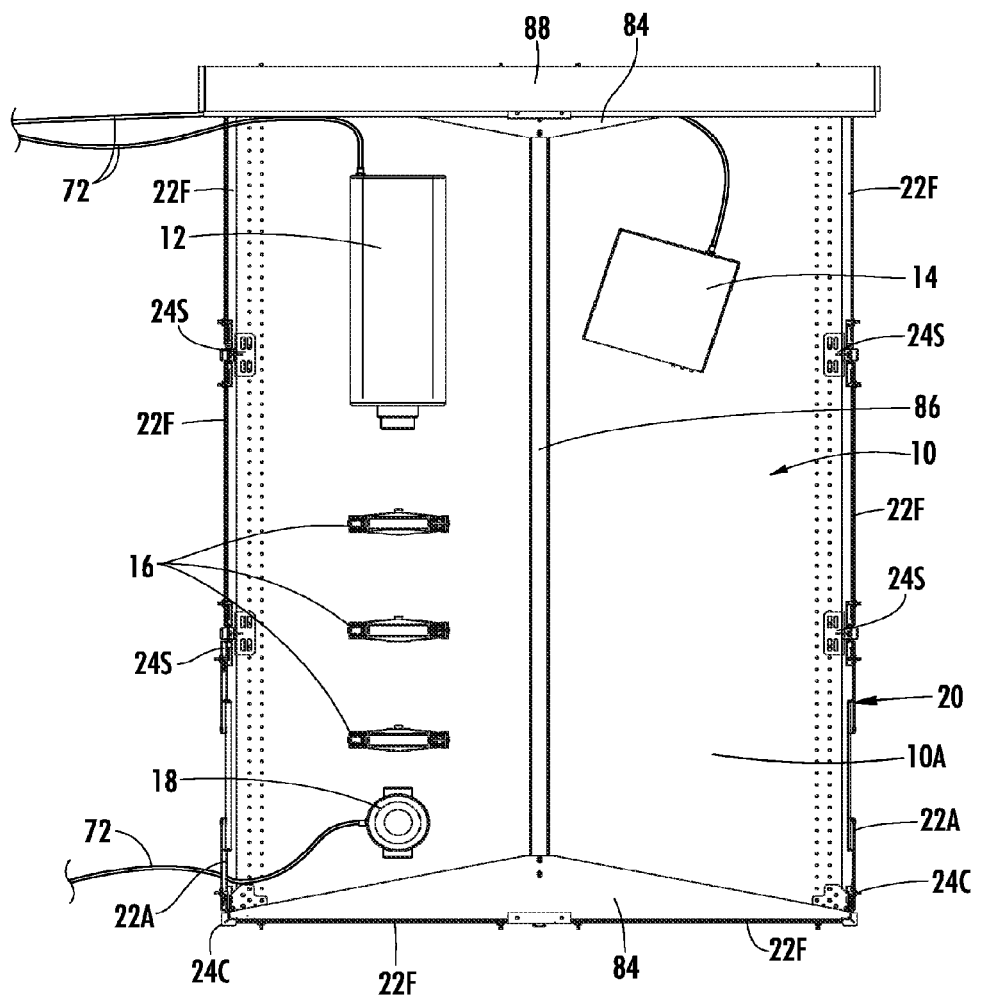
FIG. 3 is a top view thereof with the dust shade retracted.
Figure 4:
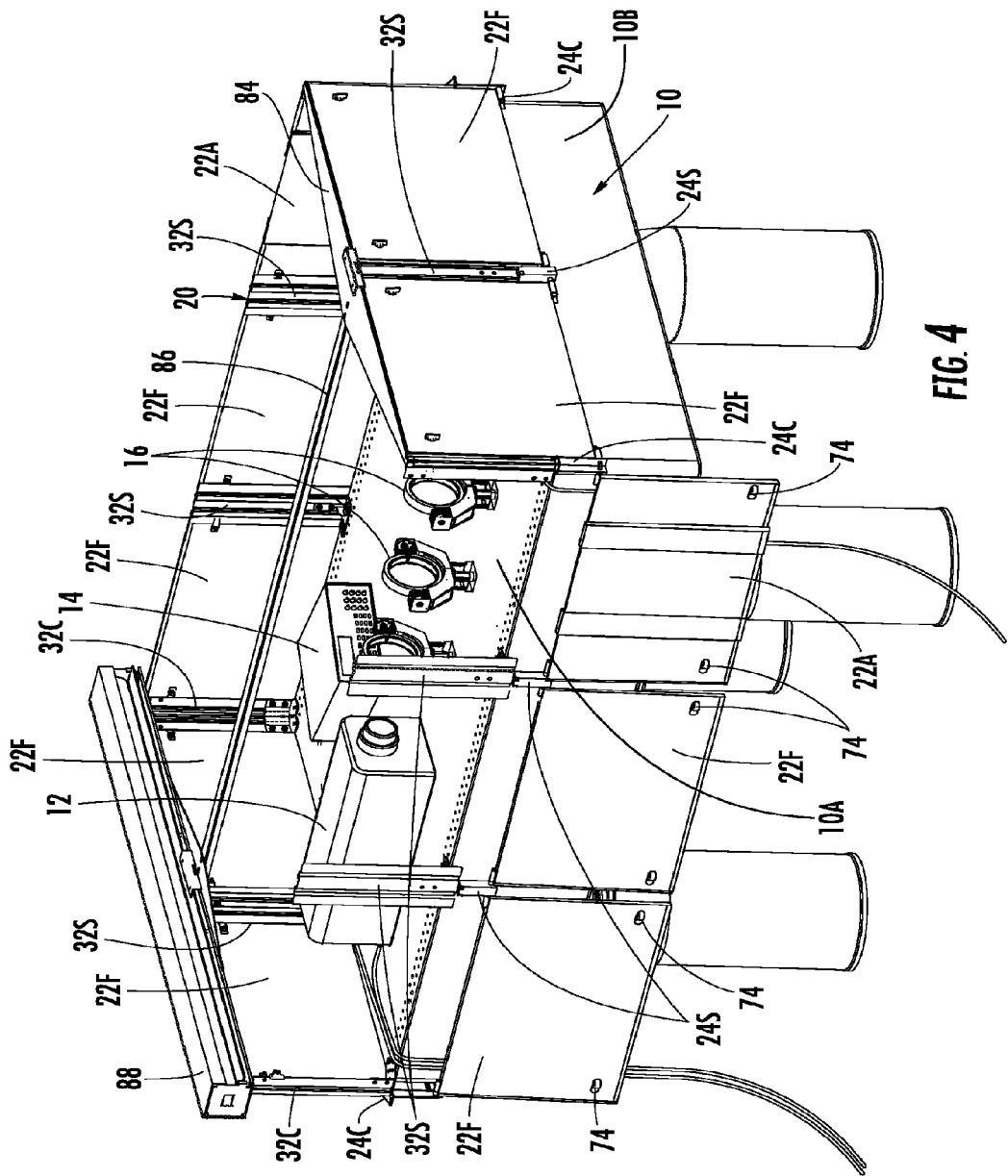
FIG. 4 is another perspective view thereof with the dust shade retracted and several of the laser barrier panels in the open position.
Figure 5:
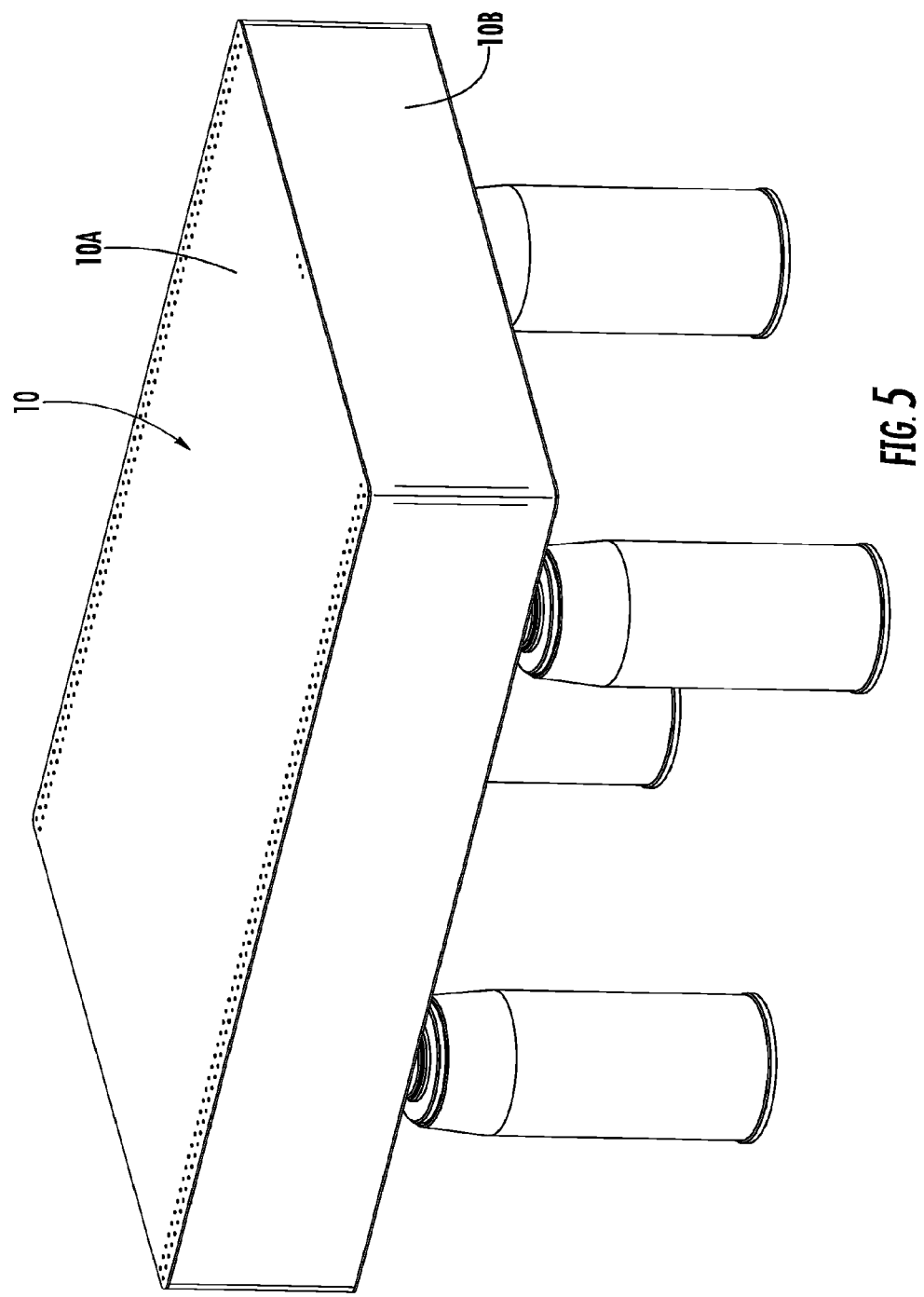
FIG. 5 is a perspective view of an optical table.
Figure 6:
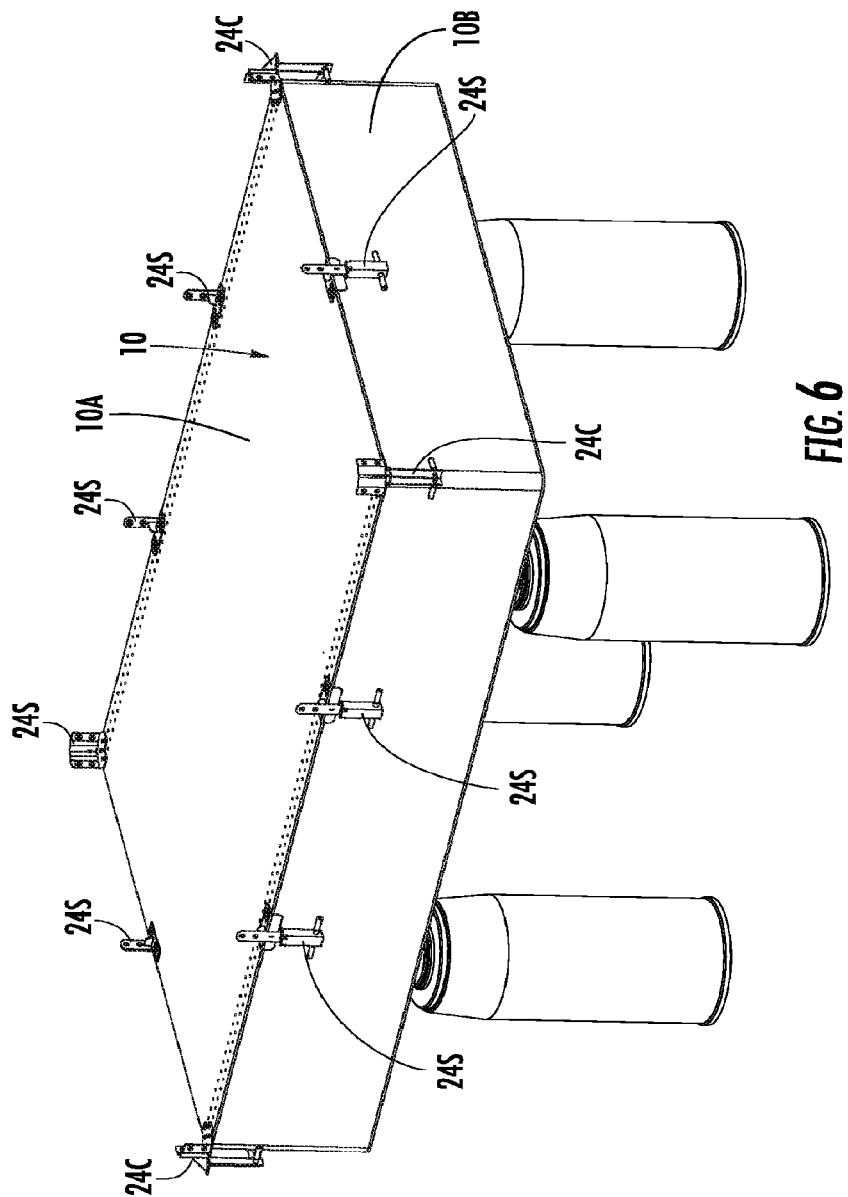
FIG. 6 is a perspective view of an optical table with the hinge brackets installed.

An optical table is generally indicated at 10 in FIGS. 1-19. Optical table 10 is conventional in the art, and is typically used in conducting optical experiments and taking optical measurements. Referring to FIGS. 2-4, exemplary optical components such as laser 12, laser controller 14, optical mounts 16, and laser detector 18 are shown on the upper surface 10A of the table 10.

A laser barrier system for the optical table 10 is illustrated and generally indicated at 20 in FIGS. 1-19. Laser barrier system 20 includes a plurality of laser barrier panels 22 hingeably mounted to the peripheral side edges 10B of the table 10 by a plurality of spaced hinge brackets 24. Each hinge bracket 24 includes a horizontal flange 26 secured to the upper surface 10A of the table 10, a lower pivot support 28 extending downwardly from the flange 26 along the side edges 10B, and an upper support column 30 extending upwardly from the flange 26 above the upper surface 10A of the table 10. Each hinge bracket 24 supports a vertically extending jamb member 32 secured to the upper support column 30. In use, the hinge brackets 24 are mounted at spaced intervals along the peripheral edges 10B of the table 10 (See FIGS. 5-6).

Figure 7:
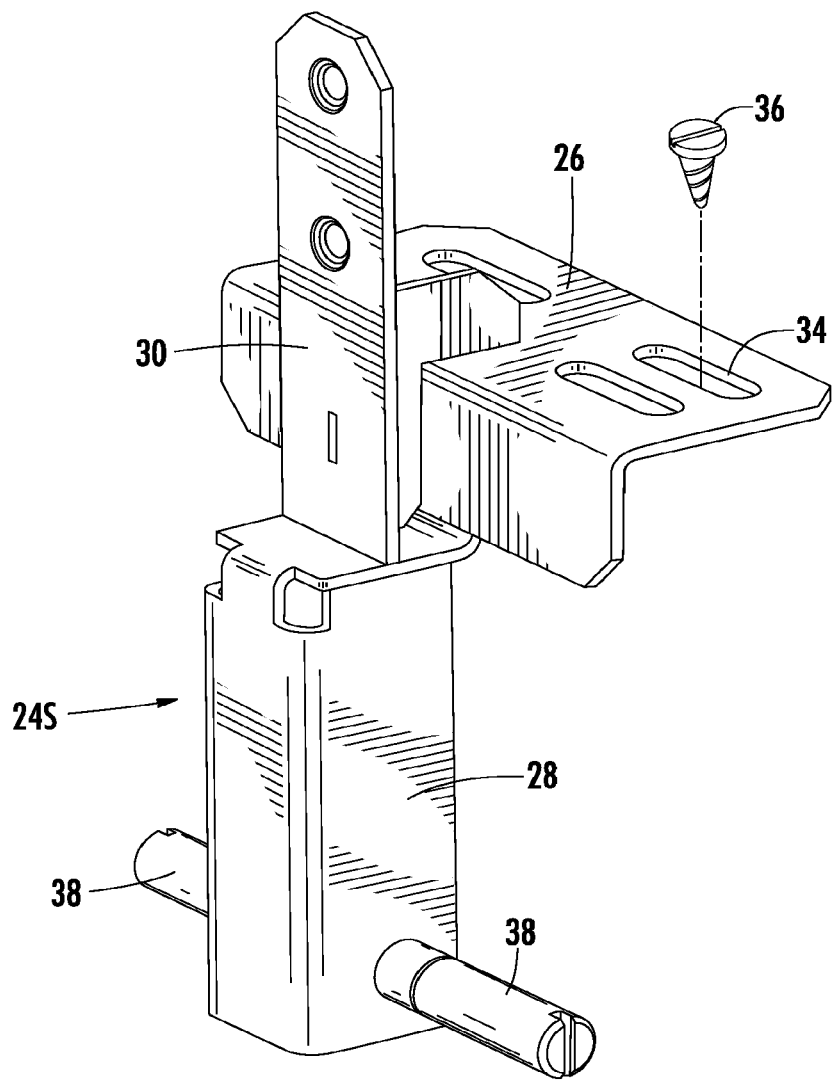
FIG. 7 is a perspective view of a side hinge bracket.
Figure 8:
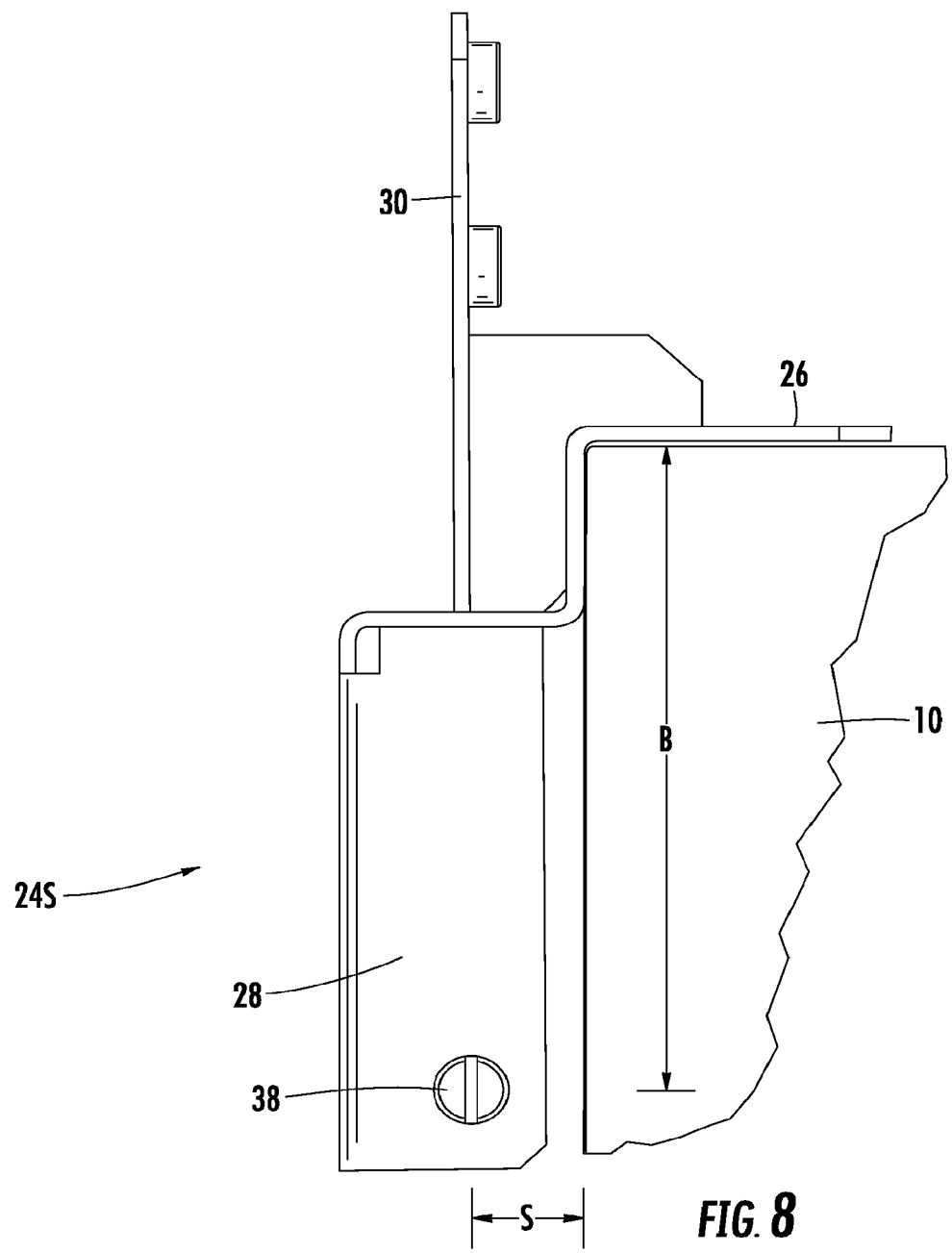
FIG. 8 is a side view of a side hinge bracket.

Referring to FIGS. 6-15, there are a plurality of side hinge brackets 24S (FIGS. 7-11) that are mounted on the flat side edges of the table 10, and a plurality of corner hinge brackets 24C (FIGS. 12-14) mounted in the corners of the table 10. As can be seen in FIGS. 7 and 8, the side hinge brackets 24S include a horizontal flange 26 having slots 34. The flange 26 is secured to the table top with fasteners 36 that extend through the slots 34 and into the upper surface 10A of the table 10. Extending downwardly from the flange 26 along the side edges 10B is a lower pivot support 28. Pivot pins 38 extend outwardly from opposing sides of the lower pivot support 28. These pivot pins 38 define a pivot axis for the laser barrier panels 22. Extending upwardly from the flange 26 is a vertical support column 30.

Figure 12:
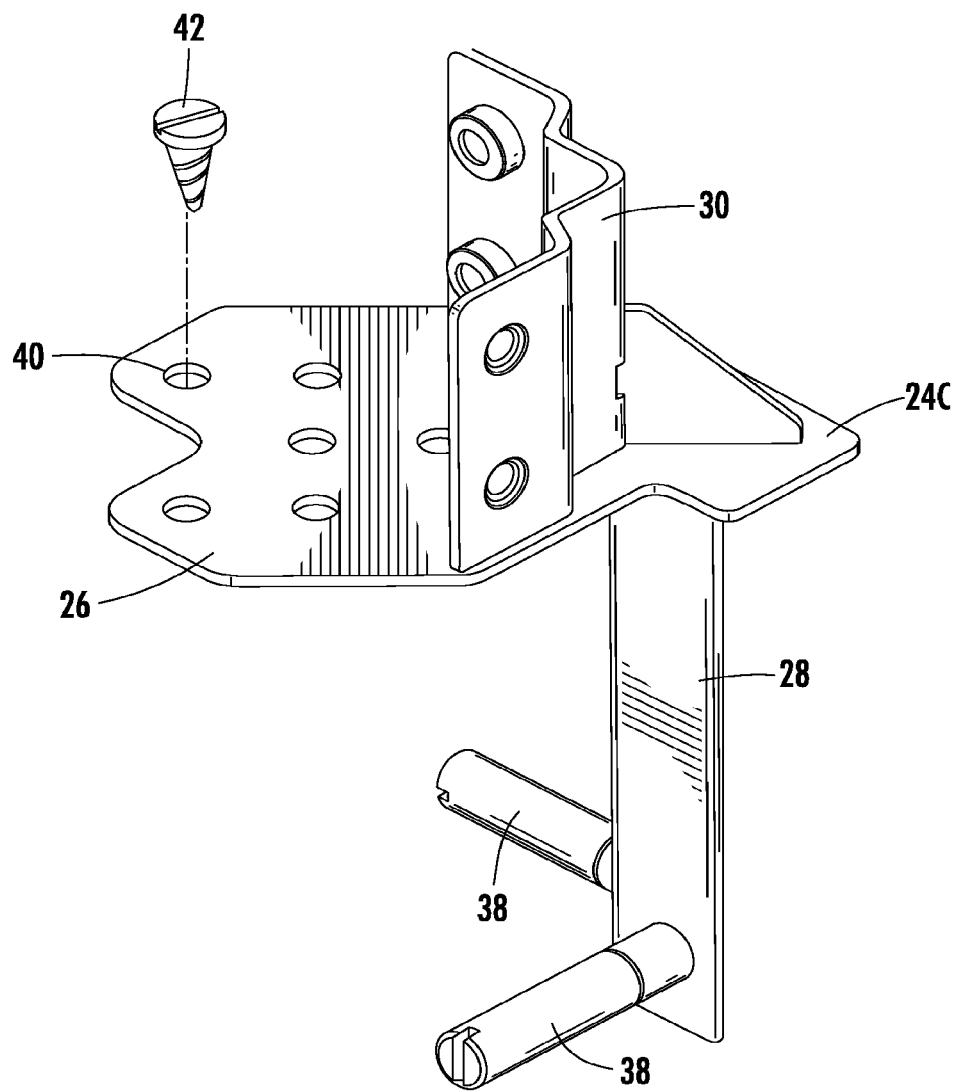
FIG. 12 is a perspective view of a corner hinge bracket.
Figure 13:
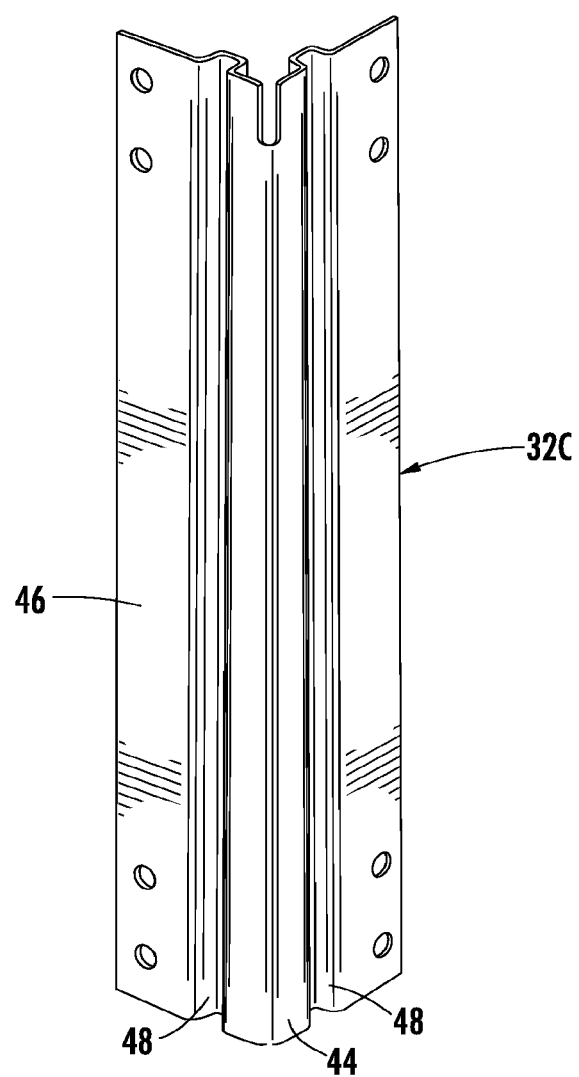
FIG. 13 is a perspective view of a corner jamb member.
Figure 14:
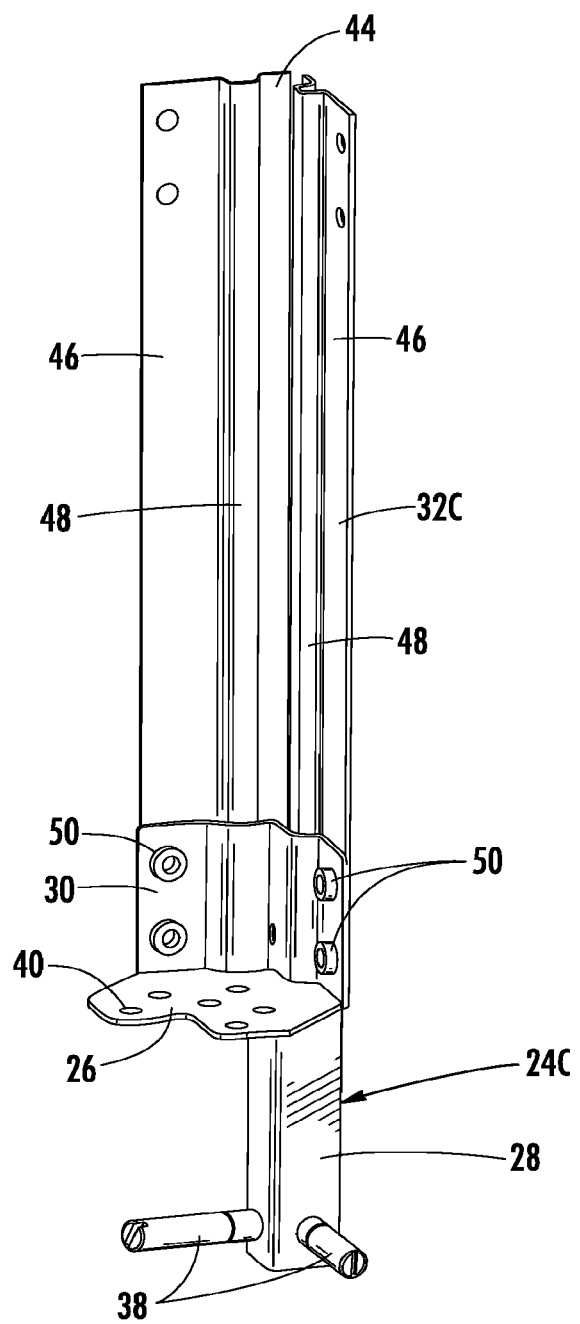
FIG. 14 is a perspective view of a corner jamb member secured to a corner hinge bracket.

As can be seen in FIGS. 12-14, the corner hinge brackets 24C also include a horizontal flange 26 having apertures 40. The flange 26 is secured to the table top with fasteners 42 that extend through the apertures 40 and into the table 10. Extending downwardly from the flange 26 is a right angle lower pivot support 28. Pivot pins 38 extend outwardly at right angles from the pivot support 28. Extending upwardly from the flange 26 is a right angle vertical support column 30.

Figure 9:
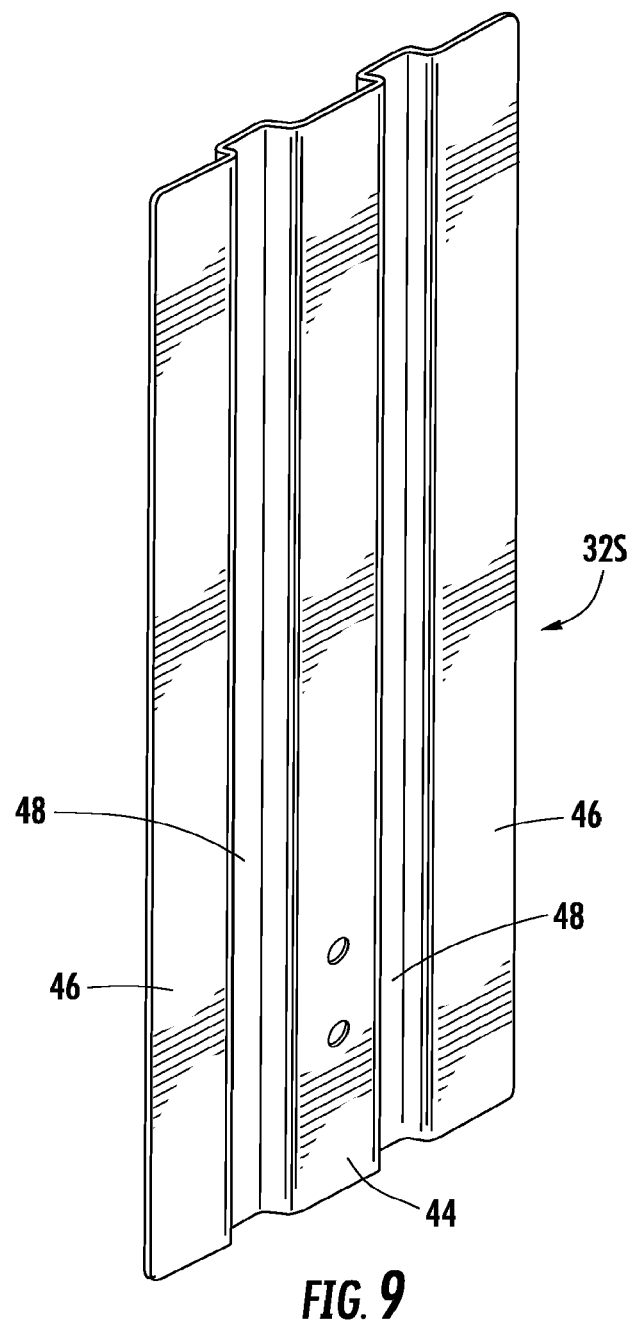
FIG. 9 is a perspective view of a side jamb member.
Figure 10:
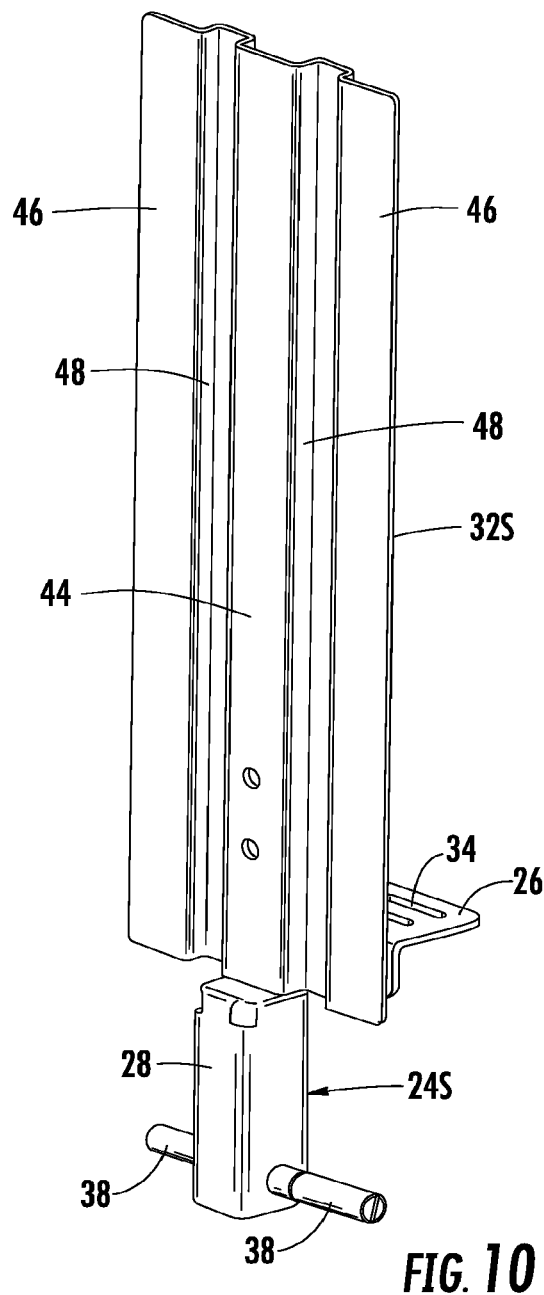
FIG. 10 is a front perspective view of a side jamb member secured to the side hinge bracket.
Figure 11:
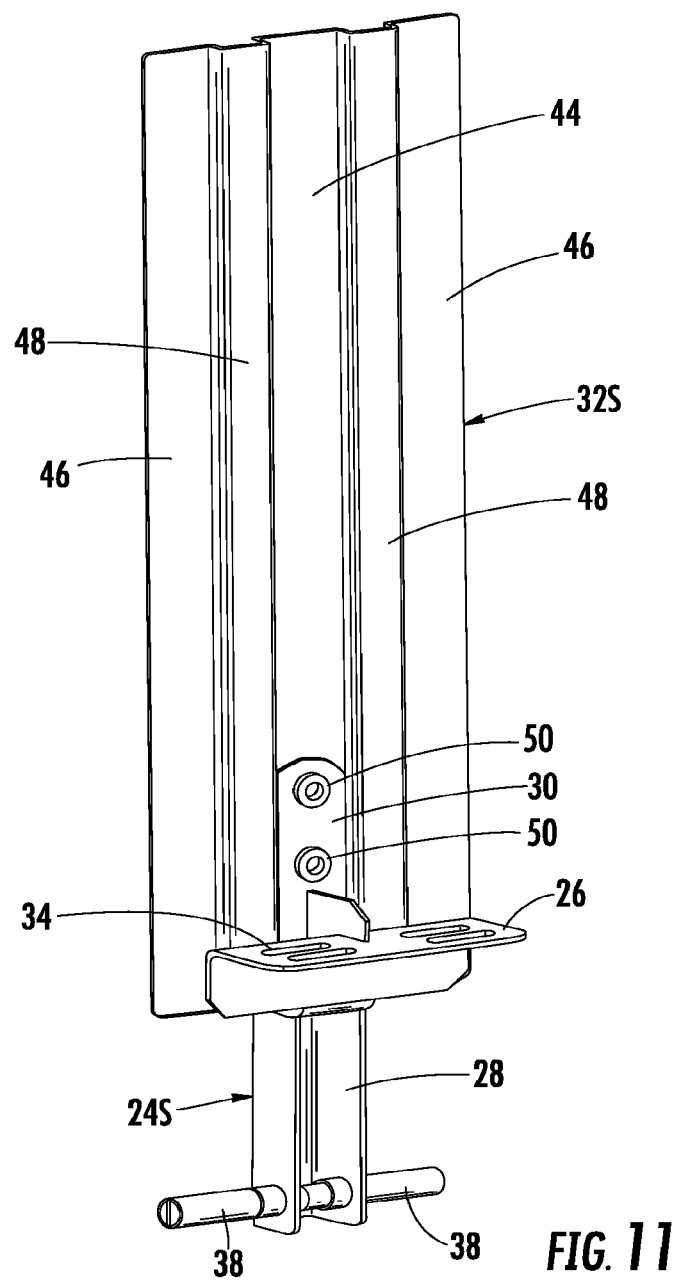
FIG. 11 is a rear perspective view of a side jamb member secured to the side hinge bracket.

A plurality of side jamb members 32S (FIGS. 9-11) are respectively supported on the plurality of side hinge brackets 24S while a plurality of right angle corner jamb members 32C (FIGS. 13-14) are respectively supported on the plurality of corner hinge brackets 24C. The jamb members 32 are fabricated from a laser absorptive material which is known in the art and include a central beam portion 44, opposing side edge portions 46 and symmetrically opposed grooves 48 on each side of the central beam portion 44. Referring to FIGS. 9-11, the central beam portion 44 of the flat side jamb members 32S is secured to the vertical column 30 of the side hinge bracket 24S by fasteners 50 (FIG. 11). Referring to FIGS. 13-14, the side edge portions 46 of the corner jamb members 32C are secured to the outer portions of the vertical support column 30 of the corner hinge bracket 24C by fasteners 50 (FIGS. 12 and 14).

Figure 15:
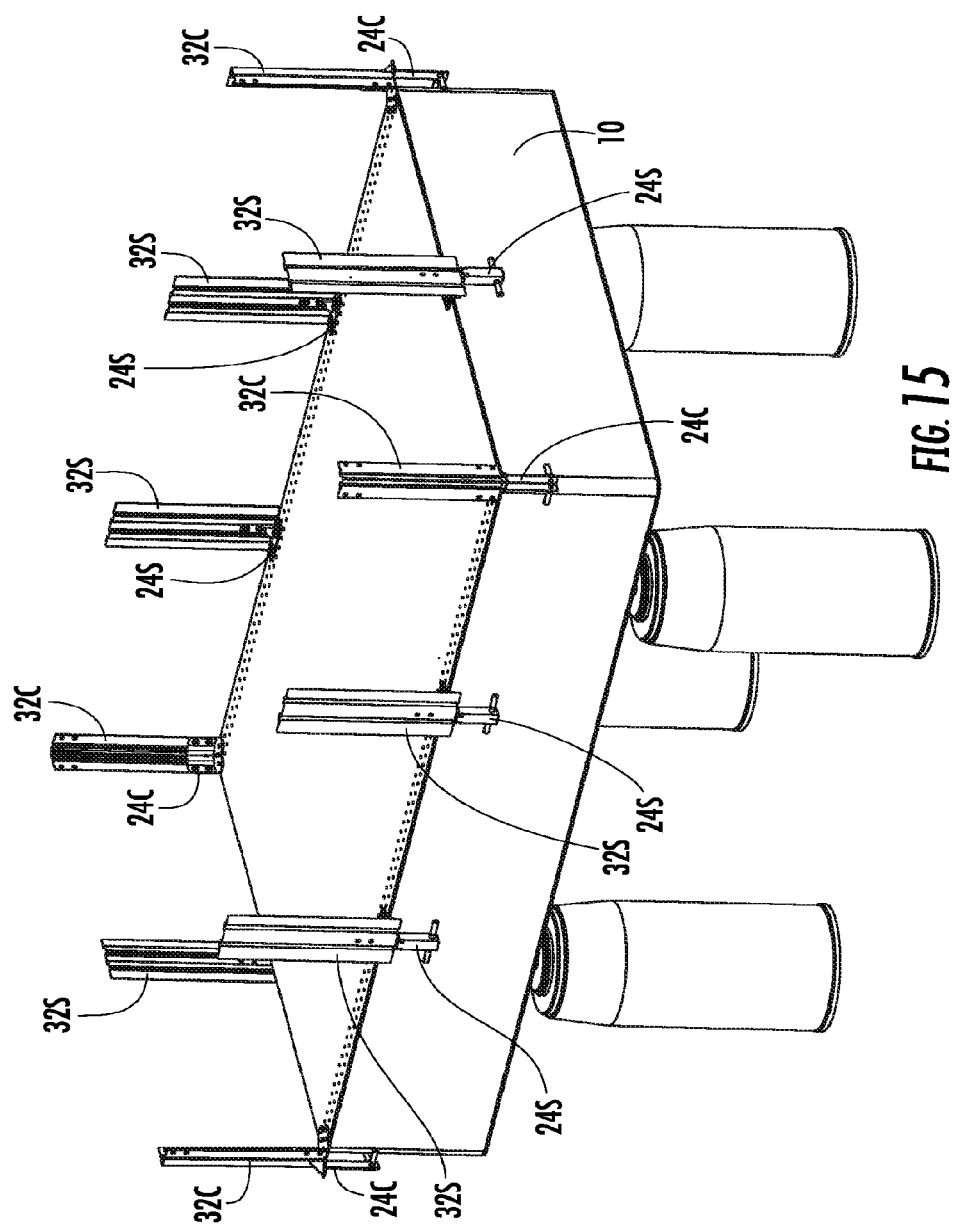
FIG. 15 is a perspective view of an optical table with the hinge brackets and jamb members installed.

Turning to FIG. 15, a plurality of side hinge brackets 24S and their associated jamb members 32S and a plurality of corner hinge brackets 24C and their associated jamb members 32C are all positioned and installed onto the peripheral edges of the table 10.

The laser barrier panels 22 are fabricated from a laser absorptive material which is known in the art. The plurality of panels 22 includes a plurality of fixed width laser barrier panels 22F (FIGS. 16-17) and at least two adjustable width laser barrier panels 22A (FIGS. 18-19).

Figure 16:
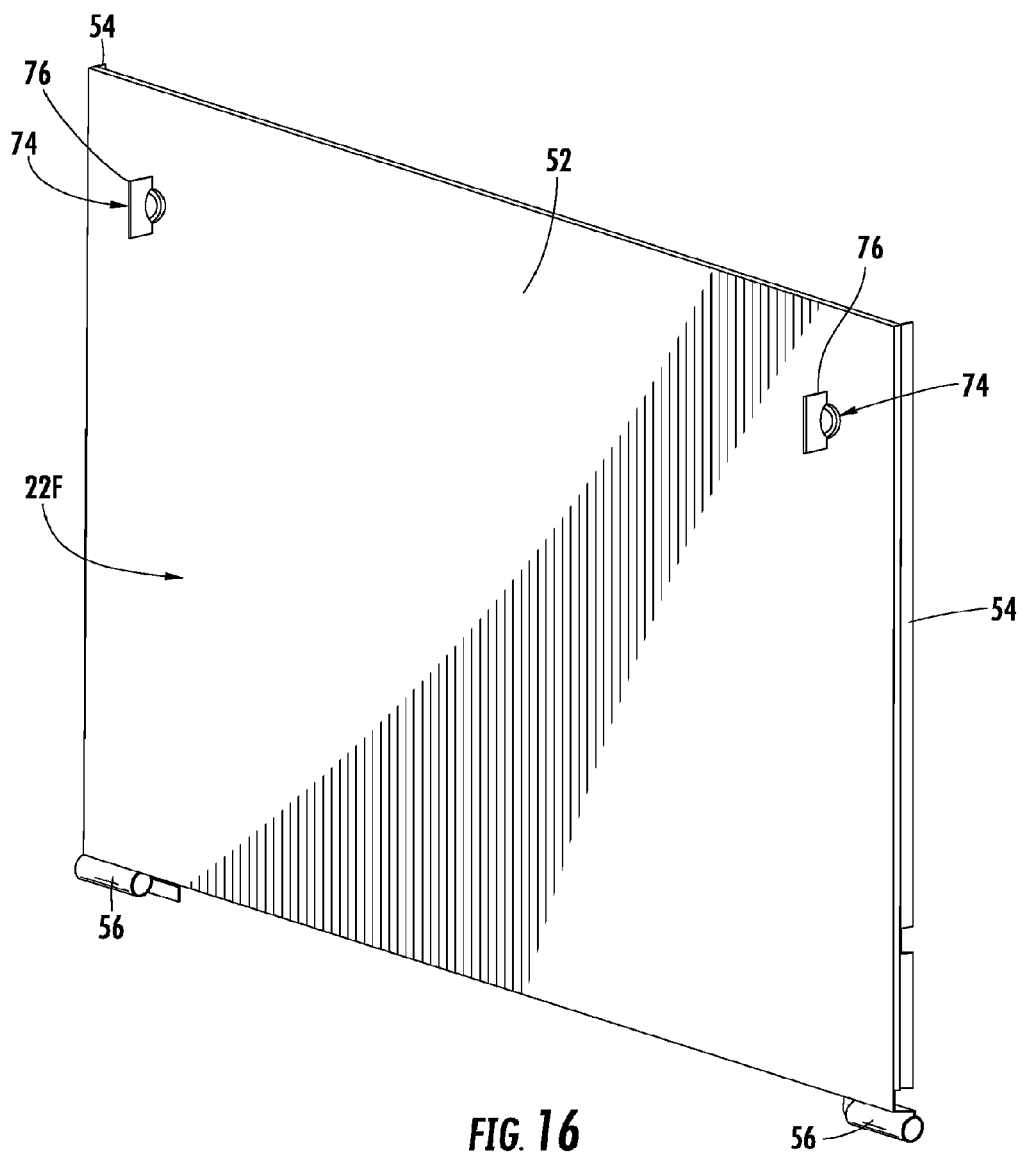
FIG. 16 is a perspective view of a fixed width laser barrier panel.
Figure 17:
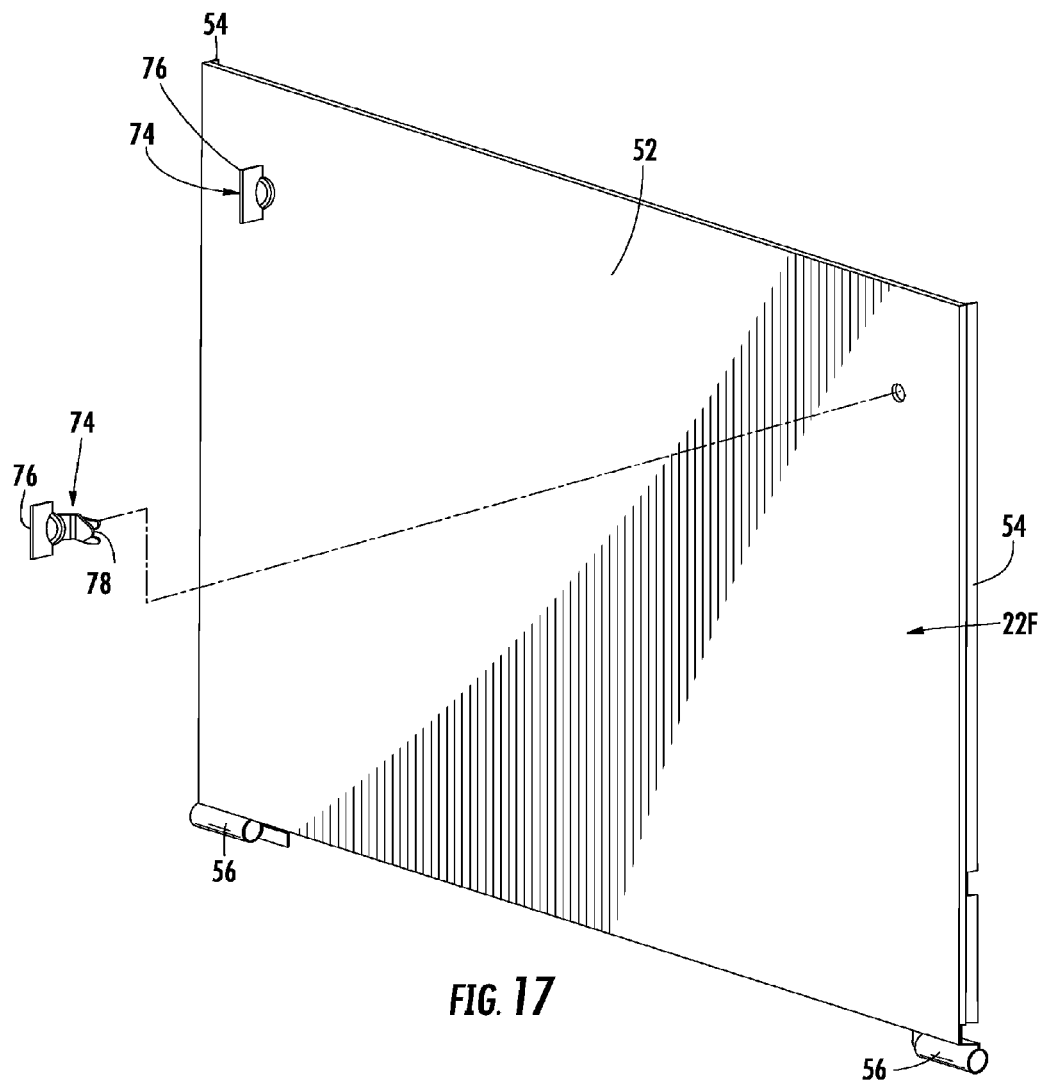
FIG. 17 is an exploded perspective view thereof.

Referring to FIGS. 16-17, the fixed width laser panels 22F each comprise a main panel 52 with left and right rearwardly turned sidewalls 54. The bottom edge of each panel 22F includes left and right pivot tubes 56 which are slidably received over corresponding pivot pins 38 to cooperatively form a hinge structure.

Figure 18:
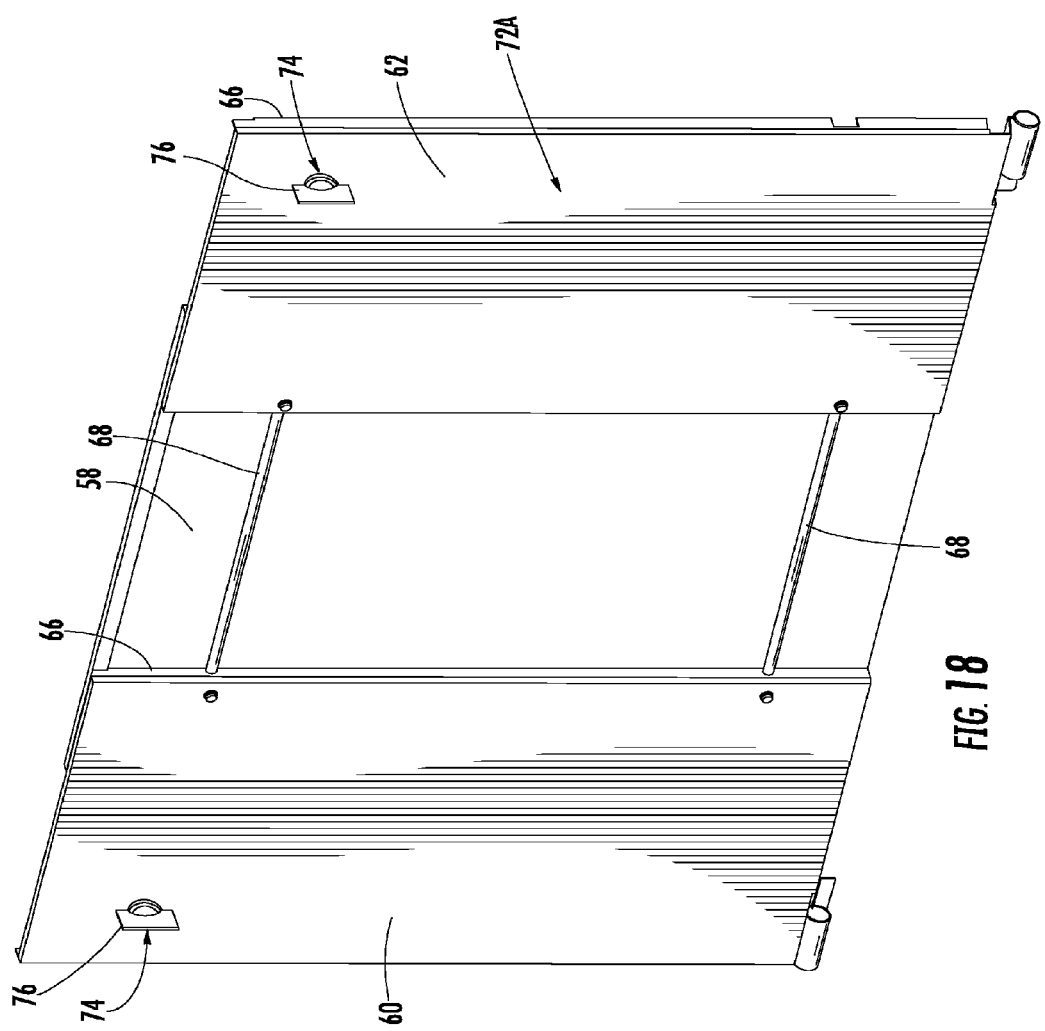
FIG. 18 is a perspective view of an adjustable laser barrier panel.
Figure 19:
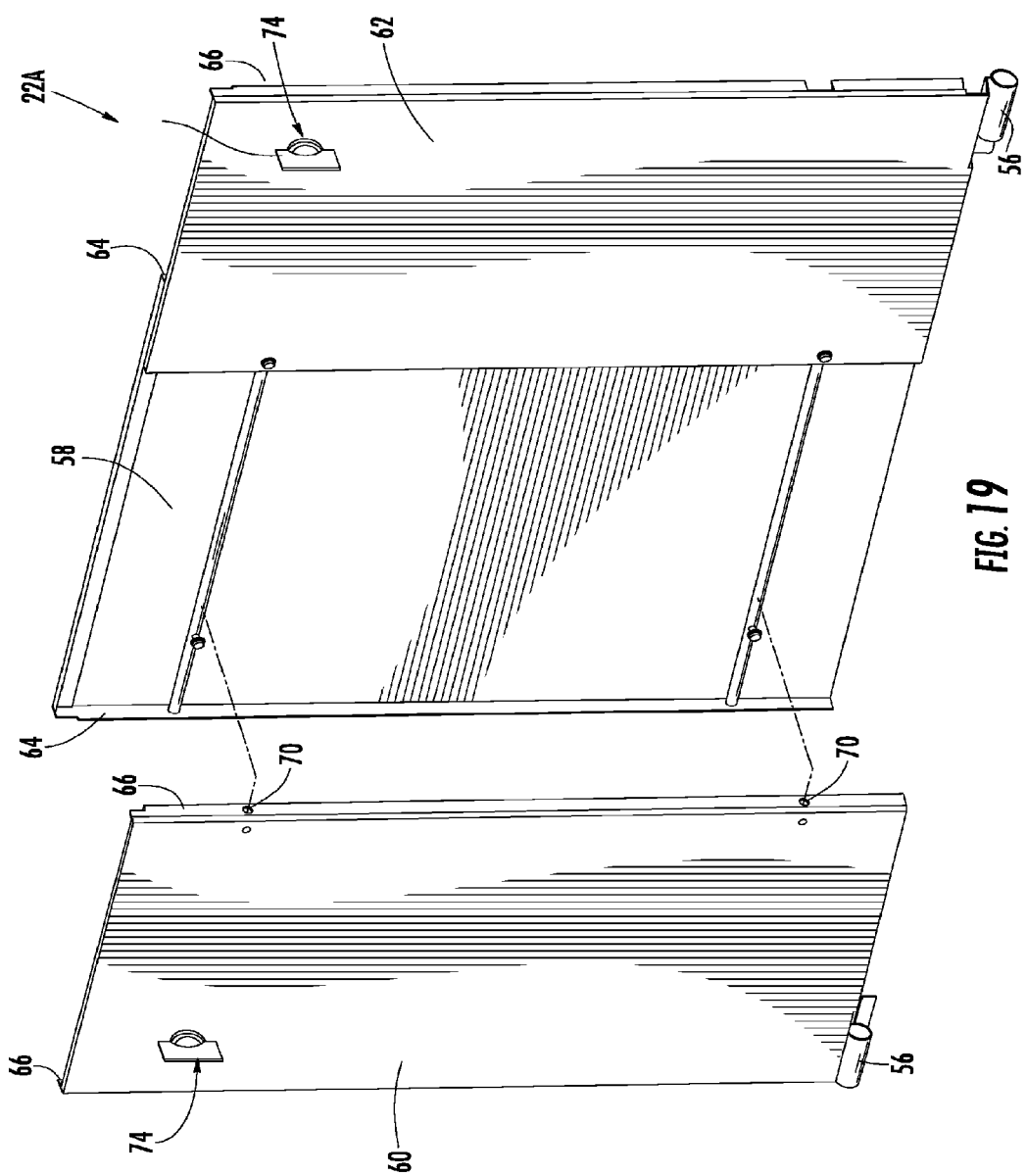
FIG. 19 is an exploded perspective view thereof.

Referring to FIGS. 18-19, the adjustable panels 22A each comprise a center panel 58, and left and right side panels 60,62. The center panel 58 includes left and right forwardly turned sidewalls 64 while the left and and right side panels 60,62 include rearwardly turned inner and outer sidewalls 66. The center panel 58 also includes upper and lower guide bars 68 supported between the forwardly turned sidewalls 64. The left and right side panels 60,62 include guide apertures 70 in the inner sidewalls 66 which are slidably received around the guide bars 68 so that the left and right side panels 60,62 are slidably movable relative to the center panel 58 to permit the panel 22A to be adjusted in width.

Referring back to FIGS. 1-4, each laser barrier panel 22F, 22A is hingeably supported by opposed pivot pins 38 between adjacent hinge brackets 24 and their associated jamb members 32, and is hingeably movable about the pivot pins 38 between a closed position (FIG. 1) and an open position (FIG. 4). When the laser barrier panels 22A,22F are in the closed position, the rearwardly turned sidewalls 54,66 nest within the grooves 48 formed in the jamb members 32 to create an overlap and improve safety.

The side hinge brackets 24S and corner hinge brackets 24C are fabricated so that the axis of the pivot pins 38 is spaced by a distance "S" (FIG. 8) away from the side edge of the table 10 creating a gap between the edge of the table 10 and the laser barrier panels 22 for the routing of cables, wires, and tubing 72 to instruments 12, 14, 16, 18 on the optical table 10 (See FIGS. 2 and 3). In addition, the axis of the pivot pins 38 is located below the surface of the table 10 by a distance "B" (FIG. 8) so that the laser barrier panels 22 overlap the side edge of the table 10. This overlap improves the safety of the system.

Turning back to FIG. 16-19, each laser barrier panel 22 is maintained in the closed position by a spaced pair of rotatable latches 74 that selectively engage with the adjacent jamb members 32. Each latch 74 comprises an actuator stud 76 extending through the front of the laser barrier panel 22 and a latch tab 78 adjacent the back wall of the panel 22. When the panel 22 is in the closed position, and the actuator stud 76 is rotated, the latch tab 78 engages with (slides behind) the peripheral side edges 46 of the jamb members 32 to secure the panel 22 in position (best shown in FIG. 4).

Again, turning back to FIGS. 1-4, the laser barrier system 10 further includes a retractable, spring-loaded dust shade assembly 80 which is seated on top of the jamb members 32 located at opposing ends of the optical table 10 and includes a shade 82 which can be unwound to cover the top of the table 10. The spring loaded dust shade assembly 80 includes opposing end brackets 84 which sit on top of the jamb members 32, and a central beam 86 extending between the end brackets 84. The retractable shade 82 is housed within a reel system 88 located at one end.

For these reasons, the laser barrier system 20 as disclosed herein is believed to represent a significant advancement in the art which has substantial commercial merit.

While there is shown and described herein certain specific structure embodying an illustrative example, it will be manifest to those skilled in the art that various modifications and rearrangements of the parts may be made without departing from the spirit and scope of the underlying concept and that the same is not limited to the particular forms herein shown and described except insofar as indicated by the scope of the appended claims.

What is claimed is:

1. A laser barrier system comprising:
   an optical table having an upper surface and a peripheral side edge;
   first and second hinge brackets configured and arranged to be mounted to said optical table in spaced adjacent relation,
   each of said first and second hinge brackets including a flange secured to said optical table, a pivot support and an upper support column extending upwardly from the flange,
   each of said first and second hinge brackets supporting a vertically extending jamb member secured to the upper support column; and
   a laser barrier panel hingeably supported between said first and second spaced hinge brackets and their associated jamb members,
   said laser barrier panel being hingeably movable between a closed position and an open position,
   said laser barrier panel including a latching member that selectively engages with one of said jamb members to selectively retain said laser barrier panel in said closed position.

2. The laser barrier system of claim 1 wherein said laser barrier panel is hingeably supported by a hinge structure comprising pivot pins extending from sides of each of said pivot supports and pivot tubes secured to said laser barrier panel.

3. The laser barrier system of claim 2 wherein a pivot axis of said pivot pins is spaced outwardly from said peripheral side edge of said optical table creating a gap between said peripheral side edge of said optical table and said laser barrier panel.

4. The laser barrier system of claim 3 wherein each of said pivot supports extends downwardly from the respective flange along said peripheral side edge of said optical table and said pivot axis of said pivot pins is spaced below said upper surface of said optical table wherein said laser barrier panel overlaps said peripheral side edge of said optical table.

5. The laser barrier system of claim 2 wherein each of said pivot supports extends downwardly from respective flange along said peripheral side edge of said optical table and a pivot axis of said pivot pins is spaced below said upper surface of said optical table wherein said laser barrier panel overlaps said peripheral side edge of said optical table.

6. The laser barrier system of claim 1 wherein opposing side edges of said laser barrier panel overlap said adjacent jamb members.

7. The laser barrier panel system of claim 1 wherein said laser barrier panel includes a spaced pair of rotatable latch tabs that selectively engage with the adjacent jamb members.

8. The laser barrier panel system of claim 1 wherein said laser barrier panel is laterally adjustable in size.

9. A laser barrier system comprising:
   an optical table having an upper surface and a peripheral side edge;
   a plurality of hinge brackets configured and arranged to be mounted to said optical table in spaced adjacent relation,
   each of said hinge brackets including a flange secured to said optical table, a pivot support and an upper support column extending upwardly from the flange,
   each of said hinge brackets supporting a vertically extending jamb member secured to the upper support column; and
   a plurality of laser barrier panels each hingeably supported by pivot pins between a respective pair of said hinge brackets and their associated jamb members,
   each of said laser barrier panels being hingeably movable between a closed position and an open position,
   each of said laser barrier panels including a latching member that selectively engages with one of said jamb members to selectively retain said respective laser barrier panel in said closed position.

10. The laser barrier system of claim 9 wherein said laser barrier panels are hingeably supported by hinge structures comprising pivot pins extending from sides of each of said pivot supports and pivot tubes secured to said laser barrier panels.

11. The laser barrier system of claim 10 wherein pivot axes of said pivot pins are spaced outwardly from said peripheral side edge of said optical table creating a gap between said peripheral side edge of said optical table and said plurality of laser barrier panels.

12. The laser barrier system of claim 11 wherein said pivot supports extends downwardly from said flanges along said peripheral side edge of said optical table and said pivot axes of said pivot pins are spaced below said upper surface of said optical table wherein said laser barrier panels overlap said peripheral side edge of said optical table.

13. The laser barrier system of claim 10 wherein said pivot supports extend downwardly from said flanges along said peripheral side edge of said optical table and pivot axes of said pivot pins are spaced below said upper surface of said optical table wherein said laser barrier panels overlap said peripheral side edge of said optical table.

14. The laser barrier system of claim 9 wherein opposing side edges of said laser barrier panels overlap said respective adjacent jamb members.

15. The laser barrier panel system of claim 9 wherein said laser barrier panels each includes a spaced pair of rotatable latch tabs that selectively engage with the respective adjacent jamb members.

16. The laser barrier panel system of claim 9 wherein at least one of said laser barrier panels is laterally adjustable in size.

17. The laser barrier panel system of claim 9 further comprising a horizontally extending dust shade assembly supported on upper portions of said jamb members.

* * * * *